Figures 1, 3, 4:
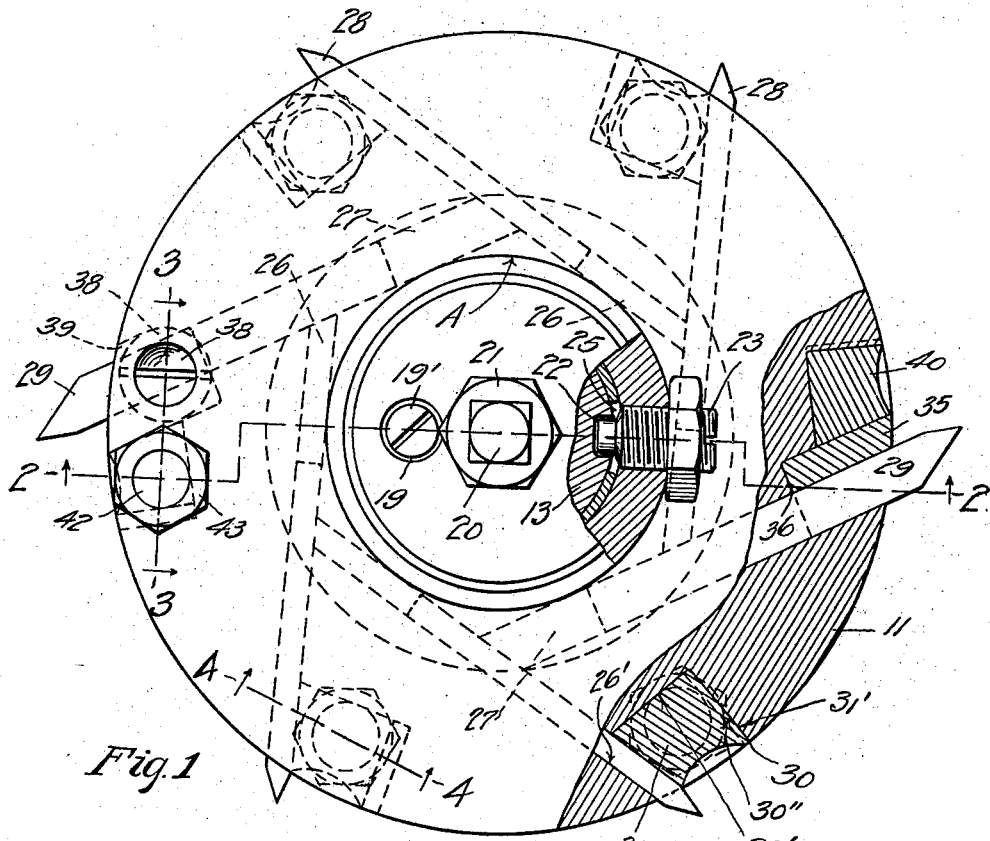

J. W. GRAY.
MATCHER HEAD.
APPLICATION FILED APR. 1, 1911.

1,029,185.

Patented June 11, 1912.

2 SHEETS—SHEET 1.

WITNESSES:
L. G. Zesbaugh
E. Peterson

INVENTOR
James W. Gray
BY
Pierre Barnes
ATTORNEY

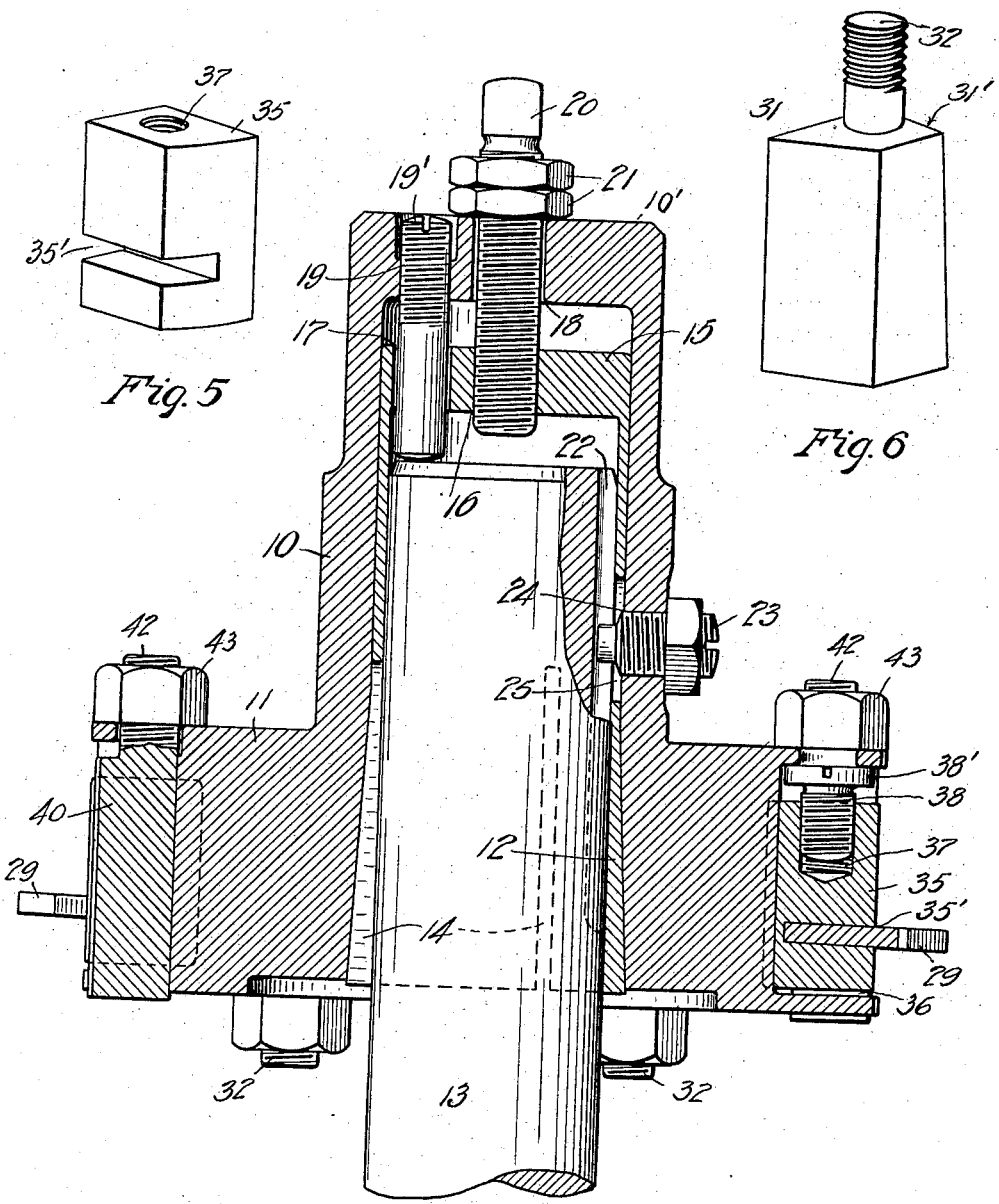

UNITED STATES PATENT OFFICE.

JAMES W. GRAY, OF TACOMA, WASHINGTON.

MATCHER-HEAD.

1,029,185.  Specification of Letters Patent.  Patented June 11, 1912.

Application filed April 1, 1911. Serial No. 618,459.

*To all whom it may concern:*

Be it known that I, JAMES W. GRAY, a citizen of the United States, residing at Tacoma, in the county of Pierce and State of Washington, have invented certain new and useful Improvements in Matcher-Heads, of which the following is a specification.

This invention relates to matcher heads which are utilized for holding cutter knives in wood planing machines or the like.

The object of my invention is the provision of cutter-knife adjusting and securing devices; and consists in the novel construction and combination of parts, as will be hereinafter described and claimed.

In the accompanying drawings, Figure 1 is a plan view, shown partly in section, of a matcher head embodying the present invention. Fig. 2 is a vertical section taken substantially on broken lines 2—2 of Fig. 1. Figs. 3 and 4 are detail sectional views through 3—3 and 4—4 of Fig. 1. Fig. 5 is a detached perspective view of a cutter-bit carrier; and Fig. 6 is a similar view of a wedge block employed in securing the knives and the bit-carrier in adjusted positions.

The reference numeral 10 designates the hub of the head body provided with an enlarged lower portion 11, which is herewith illustrated, of a cylindrical shape.

The head is formed with an axially disposed tapering socket to receive a correspondingly shaped bushing 12 which is provided with a cylindrical socket whereinto extends the end of the spindle, or arbor, 13. Said bushing has longitudinal slots 14 extending for a distance from its lower end. At the top, the bushing is provided with an end 15 having an axially disposed screw threaded hole 16 and at a distance therefrom a hole 17 unprovided with threads. In the end 10' of the hub 10 are holes 18 and 19 respectively arranged to be in alinement with the holes 16 and 17 of the bushing. The hole 19 is screw threaded for engagement with the threads of a screw bolt 19' which extends through the hole 17 of the bushing and is designed to serve as a stop against the lower end of which abuts the end of the spindle 13 to support the head thereby. Extending loosely through the hole 18 and engaging the threads in the bushing hole 16 is a screw 20 whose function is to draw the bushing more or less into the tapering socket of the hub and thereby cause the bushing to embrace the spindle and likewise maintain the axis of the head in the axis of the spindle.

21 represent lock nuts for securing the screw 20 against accidental displacement, or of its working loose during the operation of the head.

Supplemental to the securing office of the bushing, I provide a keyway 22 in the spindle to coact with a screw stud 23 extending through a threaded hole 24 in the hub, an elongated hole 25 in the bushing and thence into the keyway 22. Within the head part 11 is a number of symmetrically arranged slots 26 and 27 which, as illustrated in Fig. 1, are disposed tangentially to a circle, as A for example, of less diameter than that of the periphery of the head. The slots 26 are for the accommodation of cutter blades 28 which are employed in surfacing operations. The other slots 27 are for the reception of cutter bits 29 which are utilized for cutting tongues, grooves, or the like, in the edges of the work being planed. The depths of the slots, measured vertically, are somewhat greater than that of the respective knives or bits to afford movement for adjusting the same in directions parallel to the axis of the spindle. At the periphery, there is provided for each of the slots 26 and at one side thereof a recess 30 of greater width at the inner side 30' than at the periphery of the head, thus making a dove-tail shape in a horizontal plane. The side 30" opposite the communicating slot is formed at an angle with the remote face 26' of the groove.

Provided for each of the recesses 30 is a wedge-block 31 (see Figs. 1 and 6) of a substantially tetragonal figure in horizontal plane to correspond with the shape of the recess 30 therefor. The wedge block is also formed with a sloping side 31' to correspond with the vertical inclination of the recess side 30". Integral with each of the blocks and extending from its smaller end is a screw threaded stud 32 which passes through a hole 33, Fig. 4, in the head below the recess to receive a nut 34 acting against the under side of the head for the purpose of drawing the wedge block 31 into clamping position with respect to a blade.

For each of the bits 29 there is provided a carrier 35 movable vertically in a cavity 36 coextensive with a bit receiving slot 27. The sides of this cavity are vertical to provide a guide way for the carrier. These carriers are each provided with a groove 35' of the thickness of the respective bit and through which the latter extend. Screw threaded holes 37 are formed in the carriers to engage with the threaded ends of adjustment screws 38 having enlarged heads 38' extending into grooves, such as 39, Fig. 3, provided in the side walls of the various cavities 36. Associated with each of the carriers is a wedge block 40 operating in a recess 41. The recesses 41 and the blocks 40 are respectively similar to aforedescribed recesses 30 and the wedge blocks 31 for the cutter blade, and like them are controlled by screw studs 42 and nuts 43. In this case, however, the studs are illustrated as extending upwardly so that the nuts 43 therefor bear against the top of the head part 11.

The operation of the invention is as follows: The cutter bits 29 are adjusted as to vertical positions by first releasing the wedge blocks 40 thereof by loosening the nut 43 thereof, whereupon the bit carriers 35 are raised or lowered as may be required by manipulating the screws 38. When properly adjusted the carrier is secured against displacement by screwing the proper nut 43 down on the screw 42 thereby drawing the wedge block 40 upwardly without disturbing the vertical adjustment of the carrier but causing the latter to be pushed laterally and accordingly clamp the bit against the opposing wall of the groove 27. When a carrier is liberated from a wedge block the cutter bit thereof may be protruded more or less as may be required to suit the depth of the cut by the same. Instead of adjusting vertically both of the cutter bits, as above described, but one of them may be so adjusted with relation to the other bit, and the vertical positions of the two bits thus set, would then be regulated by moving the entire head together with its various attachments. To accomplish which, the bushing 12 is first moved downwardly through the instrumentality of the screw 20 with the result that the head is disengaged from the spindle 13. By then turning the screw 19 to advance or retract the same with respect to the under side of the head-end 10', the head is raised or lowered with respect to the spindle. After being thus adjusted, the bushing is drawn upwardly by means of the screw 20 and in so doing the tapering wall of the head-socket acting against the conical surface of the bushing causes the bushing to be contracted about the spindle as well as securing the same to the head by reason of the bushing being forcibly seated into such tapering socket. The knives 28 are adjusted as to a predetermined amount of protrusion by individually loosening the wedge blocks 31, to enable the knives to be set to gage, and finally securing the same by restoring the wedge-blocks to locking positions therewith.

It is to be noted that by the employment of bit-carriers 35 the vertical adjustment of the bit is facilitated and especially so when utilized in conjunction with the head setting screw 19. Moreover, the use of wedge blocks affords means for not only readily securing and releasing a knife 28 or the bit 29 (through the medium of the bit-carrier) but the wedge blocks, by being seated in substantially dove-tail receptacles, are themselves secured against being dislodged through the centrifugal force prevailing in fast driven machines.

What I claim, is—

1. A matcher head comprising a body provided with a tangentially disposed slot and a tangentially disposed recess communicating with the slot, an adjustable carrier mounted in said recess and provided with a groove registering with said slot, a cutter bit positioned in said slot and extending through said groove, said body further provided with a dove-tail recess communicating with that recess in which is mounted the carrier, an adjustable wedge block located in said dove-tail recess, and means for drawing said block in a direction longitudinally of the head whereby said carrier is actuated to clamp the bit in operative position.

2. A matcher head comprising the combination with a spindle, of a body mounted thereon and formed with a socket having a portion thereof tapered, a slotted bushing mounted in said socket and having a conical portion corresponding to the tapering portion of the socket, said bushing having an inner end portion formed with a pair of openings, one of said openings having a screw-threaded wall, a bolt extending through one end of said body and engaging the threaded wall of said opening for adjustably connecting the bushing to the body, that end of said body through which extends said bolt provided with an opening having a screw-threaded wall, a bolt extending through the threaded opening in the body and through the other opening of the bushing for regulating the longitudinal position of the head with respect to the spindle, and means for keying the spindle to the head.

JAMES W. GRAY.

Witnesses:
H. BARNES,
E. PETERSON.

Copies of this patent may be obtained for five cents each, by addressing the "Commissioner of Patents, Washington, D. C."